G. W. & C. W. FOSTER.

GLASS-FURNACE.

No. 7,219. Reissued July 11, 1876.

WITNESSES

R. A. George

Walter Emerson.

INVENTORS

George W. Foster

Charles W. Foster

By their Attys.

Henry W. Williams pbo

N. PETERS, PHOTO-LITHOGRAPHER, WASHINGTON, D. C.

UNITED STATES PATENT OFFICE.

GEORGE W. FOSTER AND CHARLES W. FOSTER, OF CHARLESTOWN, MASS., ASSIGNORS, BY MESNE ASSIGNMENTS, TO MARY A. FOSTER AND AMANDA E. FOSTER.

IMPROVEMENT IN GLASS-FURNACES.

Specification forming part of Letters Patent No. 129,657, dated July 23, 1872; reissue No. 7,219, dated July 11, 1876; application filed June 30, 1876.

*To all whom it may concern:*

Be it known that we, GEORGE W. FOSTER and CHARLES W. FOSTER, both of Charlestown, in the county of Middlesex and State of Massachusetts, have invented certain Improvements in Glass-Melting Furnaces, of which the following is a specification:

Our invention relates particularly to tank-furnaces, to be heated by coal or wood; and consists in the arrangement of a mound, an opening in the roof of the tank, and a cooling-space between the fire and the tank, with other portions of the furnace, as fully described below.

Figure 1:
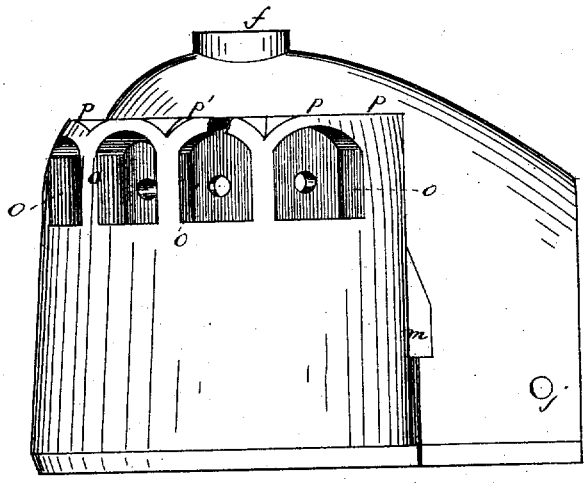
Figure 3:
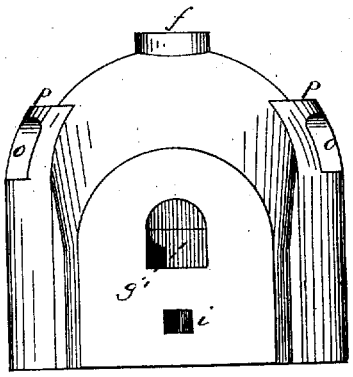
Figure 4:
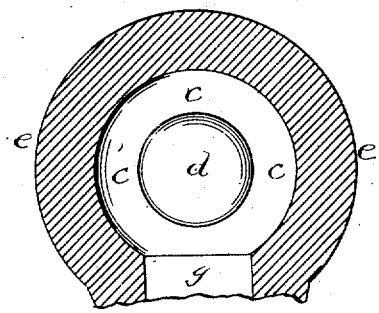
Figure 2:
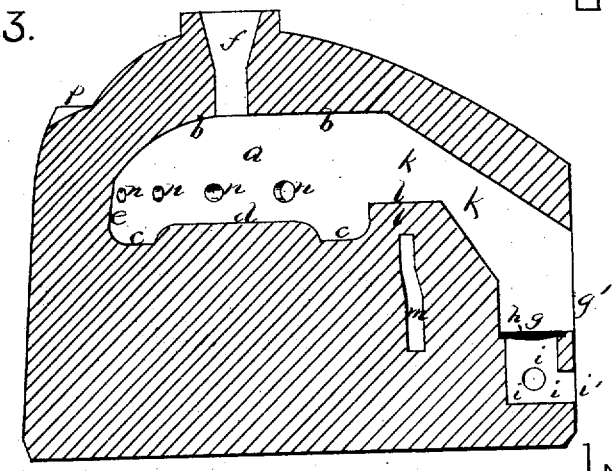

In the accompanying drawings, Figure 1 is a side elevation of a tank-furnace embodying our invention. Fig. 2 is a longitudinal section of the same. Fig. 3 is a front elevation of the same. Fig. 4 is a plan of the floor or bottom of the tank.

Similar letters of reference indicate corresponding parts.

*a* is the tank. *b* is the arched roof of the tank *a*. *c* is the floor or bottom of the tank *a*. *d* is a mound or elevation in the center of the floor *c*. *e* is the side of the tank *a*. *f* is the tunnel-shaped opening in the roof *b*, through which the raw material, or "batch," is poured into the tank *a*, and which may be used as a draft to guide and let off heat, if required. This tunnel is placed directly over the highest portion of the mound *d*, so that the batch falls upon the mound, and is immediately exposed to the flames and intense heat from the fire.

When the opening *f* is not in use for pouring in batch, it is closed by means of a clay stopple or plug. It is not used as an escape for smoke, which does not pass out through the opening *f*, but through the working-holes at the sides.

*g* is the fire-pot, placed below the level of the bottom of the tank. *g'* is the entrance or opening to the fire-pot *g*, the door not being shown in the drawing. *h* is the grate. *i* is the ash-box or "wind-box." *j* is a hole extending from either or both sides of the furnace to the box *i* under the grate *h*. This is a draft-hole intended to blow air under the grate to drive the fire. *k* is the passage leading from the fire in the fire-pot *g* to the tank *a*. *l* is the partition separating the fire-pot *g* from the tank *a*. *m* is a space between the fire-box and tank, intended to keep the partition *l* as cool as desired. This may be accomplished by driving air, water, or other cooling substance into or through the space *m*, and is an important improvement, as it prevents the partition *l* from melting, burning, or rotting away. *n n* are working-holes or ring-holes, through which the workmen gather the metal, stir, &c. *o o* are bridges or arches over the working-holes *n n*. *p p* are the tops of the arches *o o*, in which are flues to carry off smoke, regulate draft, &c.

A track may be easily constructed, upon which a car can be run, extending to the tunnel *f*, to tip the cold or hot material into the tank *a*.

The method of operating tank-furnaces and their advantages over furnaces needing pots or crucibles are so well known as to need no explanation here.

The mound *d* is very useful in bringing the batch at once into the severest heat, allowing it to run down to the floor *c* as soon as melted. If necessary, it may be raked over the surface through one of the working-holes *n n*.

It will readily be seen that by properly regulating the working-holes *n n*, tunnel *f*, openings *j*, &c., any variety of draft may be obtained. The flame may be caused to spread over the tank *a*, and the batch be melted by surface-heat, commencing with that upon the mound *d*.

We hold that by means of our improvement we economize fuel, we obtain a direct action of the flames upon the batch, we produce a more durable furnace, and we are enabled to direct and regulate the action and motion of the flames.

We do not claim a tank-furnace, or the use of a tank in a glass-melting furnace, as a part of our invention or as anything new.

Having thus fully described our invention, what we claim, and desire to secure by Letters Patent, is—

1. The combination of the mound *d*, partition *l*, tank *a*, and tunnel *f*, the said mound being placed directly under the said tunnel, substantially as specified, and for the purpose hereinbefore described.

2. The combination of the cooling-space *m*, partition *l*, tank *a*, and fire-pot *g*, substantially as and for the purpose above specified.

GEORGE W. FOSTER.
CHARLES W. FOSTER.

Witnesses:
HENRY W. WILLIAMS,
R. A. GEORGE,
CHS. S. PEIRCE,
OLIVER R. WHITLEY.